United States Patent
Weng et al.

(10) Patent No.: US 6,886,766 B1
(45) Date of Patent: May 3, 2005

(54) TAPE GUIDING ASSEMBLY FOR A TAPE DRIVE

(75) Inventors: Ming-chih Weng, Los Angeles, CA (US); Ashok B. Nayak, Glendora, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 83 days.

(21) Appl. No.: 10/342,286

(22) Filed: Jan. 15, 2003

Related U.S. Application Data (60) Provisional application No. 60/350,077, filed on Jan. 15, 2002.

(51) Int. Cl.[7] .............................................. G11B 15/67
(52) U.S. Cl. ..................................... 242/346.1; 360/95
(58) Field of Search ................................ 242/341, 346, 242/346.1, 346.2, 615.1, 615.2; 360/71, 95, 360/96.4, 130.21, 130.2

(56) References Cited

U.S. PATENT DOCUMENTS

| | | | |
|---|---|---|---|
| 4,242,709 A * | 12/1980 | Stricker | 360/96.4 |
| 4,335,857 A | 6/1982 | Pfost et al. | |
| 4,336,900 A | 6/1982 | Pontoni | |
| 4,534,523 A | 8/1985 | Zarr | |
| 4,582,235 A * | 4/1986 | Schulz | 242/615.2 |
| 4,688,742 A * | 8/1987 | Hettich | 360/96.4 |
| 4,986,490 A * | 1/1991 | Tranquilla | 242/346.2 |
| 5,173,828 A | 12/1992 | Tanzer et al. | |
| 5,297,755 A | 3/1994 | Felde et al. | |
| 5,414,585 A | 5/1995 | Saliba | |
| 5,447,279 A | 9/1995 | Janssen et al. | |
| 5,501,386 A | 3/1996 | Kobayashi | |
| 5,562,258 A | 10/1996 | Sato et al. | |
| 5,638,238 A | 6/1997 | Kubota et al. | |
| 5,860,612 A | 1/1999 | Runyon et al. | |
| 5,957,361 A * | 9/1999 | Kobayashi et al. | 242/346.2 |
| 6,116,535 A | 9/2000 | Selg et al. | |
| 6,118,630 A | 9/2000 | Argumedo | |
| 6,141,184 A | 10/2000 | Daly | |
| 6,320,727 B1 | 11/2001 | Cope et al. | |
| 6,600,624 B2 * | 7/2003 | Cope et al. | 360/95 |
| 6,633,449 B1 * | 10/2003 | Anderson et al. | 360/130.21 |
| 6,639,759 B2 * | 10/2003 | Inoguchi et al. | |

* cited by examiner

Primary Examiner—William A. Rivera
(74) Attorney, Agent, or Firm—Thelen Reid & Priest, LLP (57) ABSTRACT

A tape drive with a tape guiding assembly guides tape past the read/write head along a tape path. First and second inner guide rollers are disposed along the tape path on opposite sides of the read/write head and adjacent to the read/write head. First and second outer guides are disposed along the tape path on opposite sides of the read/write head. The inner guides are positioned off-centered with respect to the nominal tape path, while the outer guides are centered on the nominal tape path. The inner guides are adjustable in height and in radial direction to adjust the off-center position of the inner guides, as well as the tape wrap and penetration of the read/write head into the tape.

18 Claims, 8 Drawing Sheets

TAPE GUIDING ASSEMBLY FOR A TAPE DRIVE

RELATED APPLICATIONS

This application claims priority to provisional application 60/350,077, filed on Jan. 15, 2002.

FIELD OF THE INVENTION

The present invention relates to the field of tape drives, and more particularly, to a tape guiding assembly in a tape drive.

BACKGROUND OF THE INVENTION

In a tape drive, a tape is transported from a supply reel to a takeup reel along a tape path. Along the tape path, and between the reels, the tape is wrapped on a read/write head for recording and playback. In order to achieve very high track density data on a tape, lateral motion of the tape at the read/write head needs to be constrained. In other words, at the interface of the read/write head and the tape, it is undesirable to allow the tape to wander laterally from the desired tape path.

Another consideration in guiding the tape is the wrap angle and penetration of the read/write head. In order to achieve reliable recording and playback, the wrap angle and penetration at the read/write head needs to be properly aligned.

For addressing these problems, certain systems have used compliant tape guides to constrain the tape motion, but the compliant guides need to be very soft for thinner tapes, and resonance is difficult to eliminate. Other prior art systems use tapered or crowned rollers to control the tape motion, but the effects of these special shaped rollers become less efficient when thinner tape is used.

Other attempts at constraining the tape edges have used alternate edge guiding by fixed flanges. A concern with such solutions is the wearing of the tape edge by the fixed flanges. Another solution uses alternate edge guiding, but with flanged rollers. However, such an arrangement aligns two groups of rollers to two reference surfaces respectively.

SUMMARY OF THE INVENTION

There is a need for a system to guide tape in a tape drive that effectively constrains lateral motion of the tape at the read/write head without wearing the edges of the tape. There is also a need for a tape guide assembly that provides tape wrapping alignment in addition to the tape guiding function.

These and another needs are met by embodiments of the present invention, which provide a tape guiding assembly for a tape drive comprising a takeup reel that receives tape from a supply reel and means for constraining the motion of the tape. In certain embodiments of the invention, the means includes four guides that are serially positioned along a tape path between the takeup reel and a supply reel. The four guides, in these embodiments, include two outer guides and two inner guides that are symmetrically disposed along the tape path on opposite sides of a read/write head. The two outer guides are centered at a nominal tape path and the two inner guides are positioned off-centered from the nominal tape path.

With the present invention, alternate edge guiding is achieved without the definition of two reference surfaces for each roller. In certain embodiments, the guides are adjustable rollers that may be adjusted both in the vertical and radial directions.

The earlier stated needs are also met by embodiments of the present invention which provide a tape drive with a tape guiding assembly that guides tape past a read/write head along a tape path. The tape guiding assembly comprises first and second inner guides disposed along the tape path on opposites of the read/write head and adjacent to the read/write head. First and second outer guides are disposed along the tape path on opposite sides of the read/write head and further from the read/write head than the first and second inner guides. The first and second inner guides are positioned off-centered with respect to a nominal tape path and the first and second outer guides are centered on the nominal tape path. In certain embodiments of the present invention, the first and second outer guides are fixed in position while the first and second inner guides are adjustable in height to adjust off-center positioning of the inner guides with respect to the nominal tape path. In still further embodiments of the invention, the first and second inner guides of the tape drive are adjustable in radial direction to adjust tape wrap and penetration of the read/write head into the tape.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses problems related to the constraining of tape motion, and aligning tape wrapping and penetration of the read/write head of a tape drive. The present invention achieves this by constraining the lateral motion of the tape and aligning the wrap angle and penetration of the read/write head through the use of four guides that implement alternate edge guiding of the tape. This alternate edge guiding is accomplished with rollers without the definition of two reference surfaces for each roller. The rollers can be adjusted in their off-center position with respect to a nominal tape path, as well as in the radial direction to adjust the tape guiding and tape wrapping alignment.

Figure 1:
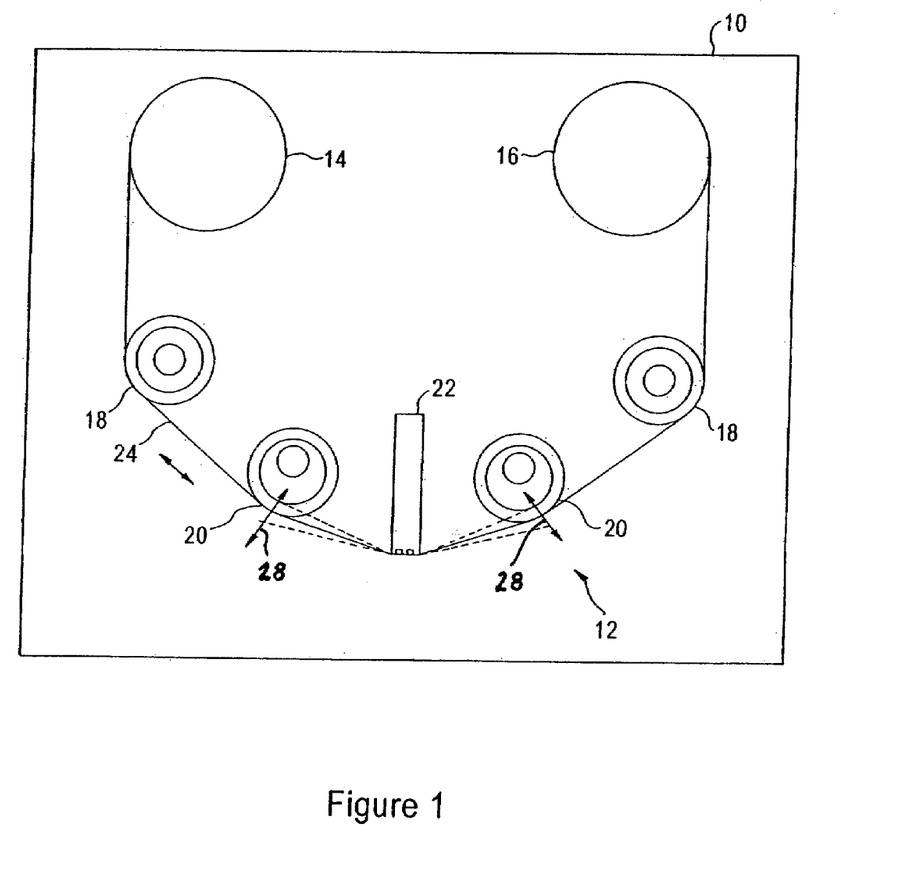
FIG. 1 is a schematic depiction of the top view of a portion of a tape guide assembly constructed in accordance with embodiments of the present invention.

FIG. 1 depicts a schematic top view of the tape guiding assembly employed in the tape drive in accordance with embodiments of the present invention. The tape drive is indicated schematically as reference numeral 10, and in FIG. 1, only portions of the tape guiding assembly 12 are depicted.

Magnetic tape 24 is guided between a supply reel 14 and a takeup reel 16. The supply reel 14 is part of a tape cartridge, while the takeup reel 16 is permanently located within the tape drive 10.

The tape guiding assembly 12 has four guides: two outer guides 18 and two inner guides 20. The two outer guides 18 are fixed guides and do not adjust in either the vertical or radial directions. The two inner guides 20, which are closer to the read/write head 22 than the two outer guides 18, are adjustable in both the vertical and radial directions in certain embodiments of the present invention. In its top view, the direction of adjustability of the inner guides 20 in the radial direction is indicated by arrows 28. This causes the inner guides 20 to be moved further into and out of the tape path 26. The movement of the inner guides 20 in the radial direction causes an adjustment of a desired penetration of a tape 24 by the head 22, as well as the wrap angles, and the symmetry of the tape wrapping at the read/write head 22.

Figure 2:
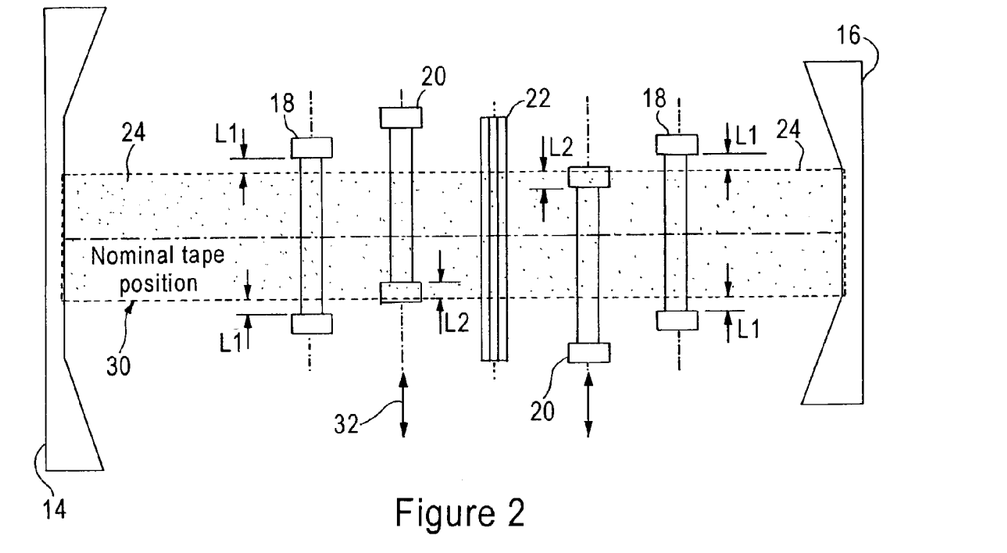
FIG. 2 is a side view of the tape guide assembly of FIG. 1, depicting exemplary roller positions relative to a nominal tape position.

FIG. 2 depicts a schematic side view of the tape guiding assembly 12 in accordance with embodiments of the present invention. A nominal tape path 30 is depicted for transferring tape between the supply reel 14 and the takeup reel 16. In this embodiment, the outer guides 18 and the inner guides 20 are all guide rollers. However, the outer guides 18 are considered to be fixed guides, while the inner guides 20 are formed as adjustable guide roller assemblies, and will be described in more detail later.

The outer guides 18 are centered at the nominal tape path 30, providing a clearance of L1 on each side (i.e., top and bottom) of the tape 24. The outer guides 18 are not adjusted with respect to the nominal tape path 30.

The inner guides 20 are adjustable in the directions indicated by arrows 32 vertically to clamp the tape 24 at the alternating edges. The adjustment is made to the inner guides 20 to clamp the tape at the alternating edges with an interference of L2. In the depicted embodiment of FIG. 2, each of the rollers of the inner guides 20 and the outer guides 18 have flanges.

Figure 3:
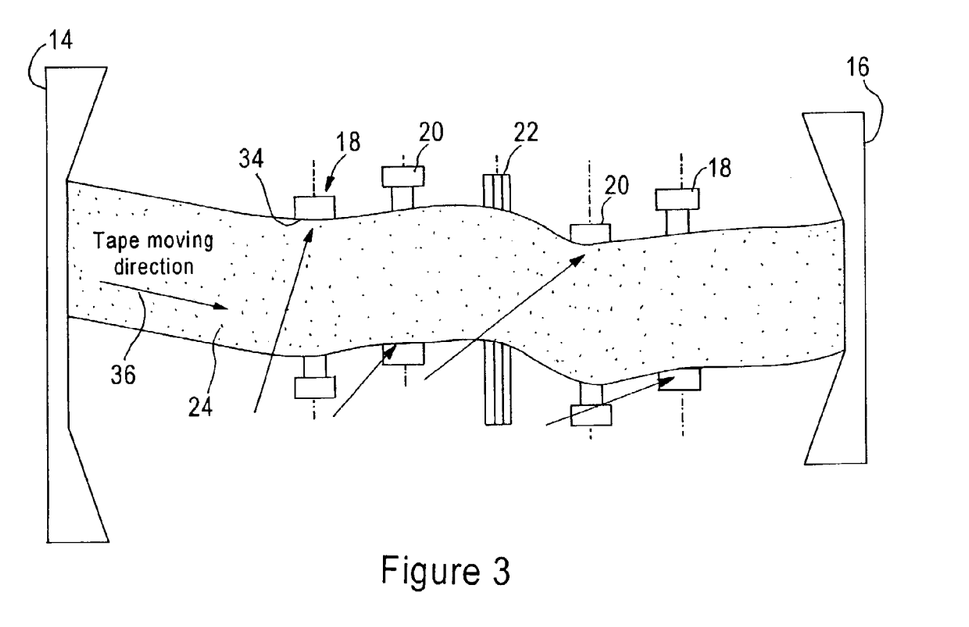
FIG. 3 shows the tape guiding assembly of FIG. 2, with the tape guiding assembly constraining tape motion when the tape leaves the supply reel from a high position.
Figure 4:
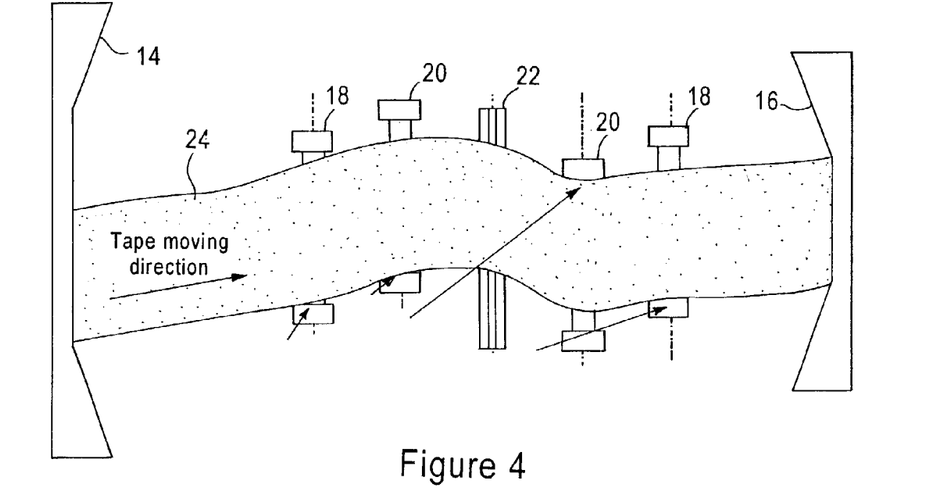
FIG. 4 is similar to FIG. 3, but depicts the constraining of the tape when the tape leaves the supply reel from a low position.

Referring to FIGS. 3 and 4, it becomes apparent that in the tape moving direction 36, when the tape 24 comes off the supply reel 14 in either a high position or a low position, the rollers forming the inner guides 20 and the outer guides 18 act to constrain the tape motion in a vertical direction. The contact edges 34 contact the tape 24 to constrain the tape motion.

Because the lateral motion of the tape 24 at the read/write head 22 has been constrained, a higher track density of data on the tape 24 can be achieved. The amount of interference L2 depends upon the strength of the tape 24. It is important for the tape edge not to be damaged, so that the height adjustment (i.e., the off-center positioning of the inner guides 20) is made to constrain the tape motion but not damage the tape edge.

In the embodiments of FIGS. 3 and 4, the inner guide 20 closer to the supply reel 14 is off-centered above the nominal tape path 30 while the inner guide 20 that is closer to the takeup reel 16 is off-centered below the nominal tape path 30. In other embodiments of the invention, these positions are reversed so that, the inner guide 20 closer to the supply reel 14 is positioned off-centered below the nominal tape path 30, and the inner guide 20 closer to the takeup reel 16 is positioned off-centered above the nominal tape path 30.

In still other embodiments, both of the inner guides 20 are positioned off-centered above the nominal tape path 30, and in other embodiments, both of the inner guides are off-centered below the nominal tape path 30.

For applications where the tape is preferred to fly and slip through the guides, the inner guides 20 are provided with a smooth surface-finish. For applications where the tape is preferred not to fly over the guides, the inner guides 20 have a rough surface-finish, a porous surface-finish, or a grooved surface-finish. In a grooved surface-finish, helical grooves are preferred to prevent tape imprint.

Figure 5:
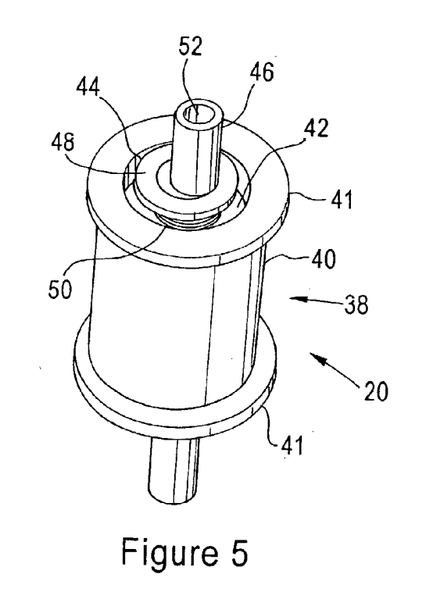
FIG. 5 is a top, perspective view of an adjustable guide roller constructed in accordance with embodiments of the present invention.
Figure 6:
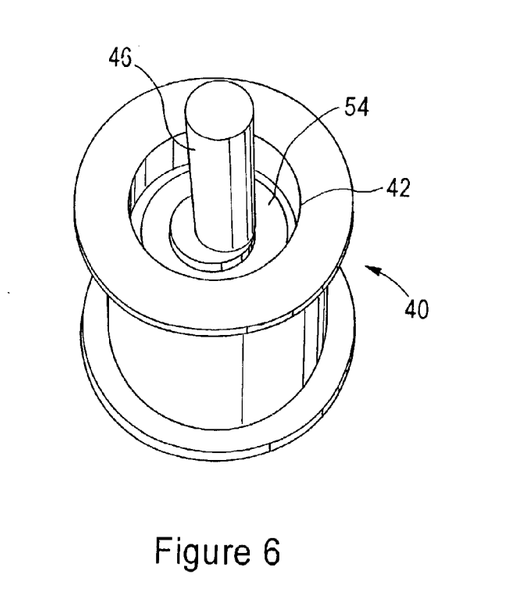
FIG. 6 is a bottom, perspective view of the adjustable guide roller of FIG. 5.

An exemplary embodiment of an adjustable guide roller assembly 38 that may be used as the inner guides 20, is depicted in FIGS. 5 and 6. FIG. 5 shows a top, perspective view of the adjustable guide roller assembly 38. A guide roller 40, having flanges 41 at its top and bottom axial extents, has a central opening 44 in which ball bearings 42 are provided. In preferred embodiments of the invention, two ball bearings 42 are provided, although only the top ball bearing 42 is depicted in FIG. 5. Within the central opening 44 of the guide roller 40, an eccentric shaft 46 is mounted. A pre-load washer 48 is fixed to the shaft. A bearing pre-load spring 50 will pre-load both the ball bearings 42.

A tapped hole 52 is provided in the top of the eccentric shaft 46. The tapped hole 52 allows for adjustment of the positioning of the adjustable guide roller assembly 38, as will be described later.

FIG. 6 depicts a bottom perspective view of the adjustable guide roller assembly 38. The bottom of the eccentric shaft 46 can be seen. A shaft biasing washer 54 is provided and serves at least two functions. The shaft biasing washer 54 is a shoulder type washer, where the shoulder supports the lower ball bearing 42, visible in FIG. 6. The other portion of the washer 54 acts as a seat for the eccentric shaft biasing spring 60, (only seen in FIG. 7). The lower portion of the eccentric shaft 46 rests in a precision hole of the base plate (not shown) of the tape guide 10.

Figure 7:
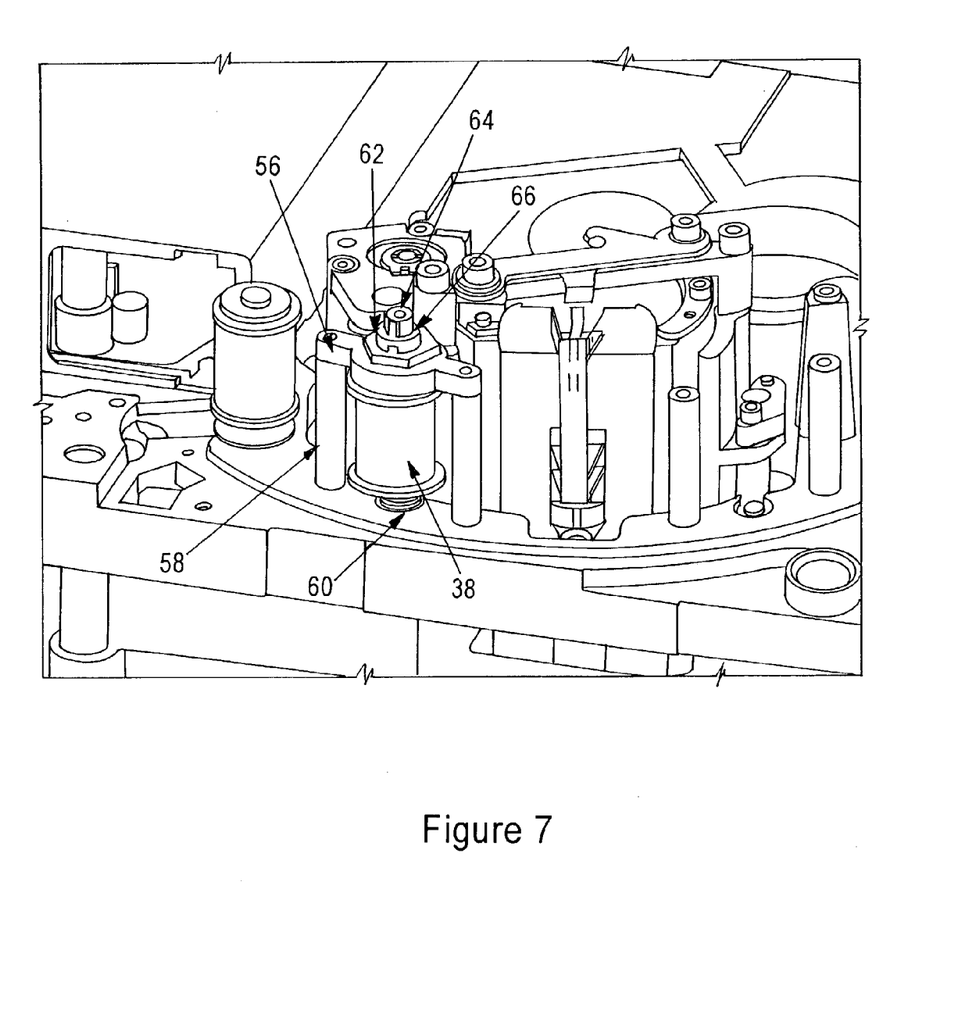
FIG. 7 is a perspective view of a portion of a tape drive constructed in accordance with embodiments of the present invention, particularly depicting the tape guiding assembly.

FIG. 7 depicts the adjustable guide roller assembly 38 mounted on the base plate 90. A mounting plate 56 is supported by two posts 58 connected to the base plate 90.

The bottom of the eccentric shaft 46 is guided into the precision hole of the base plate 90 and is biased in the upward direction using eccentric shaft biasing spring 60. The eccentric shaft 46 rests against a height setting nut 62. When the height setting nut 62 is rotated, the shaft 46 moves up or down, the shaft 46 moving by the same amount as the nut 62 since the shaft 46 is biased against the nut 62. The attachment of the guide roller 40 to the eccentric shaft 46 causes the guide roller 40 to also move upwardly or downwardly with the shaft 46.

Figure 8:
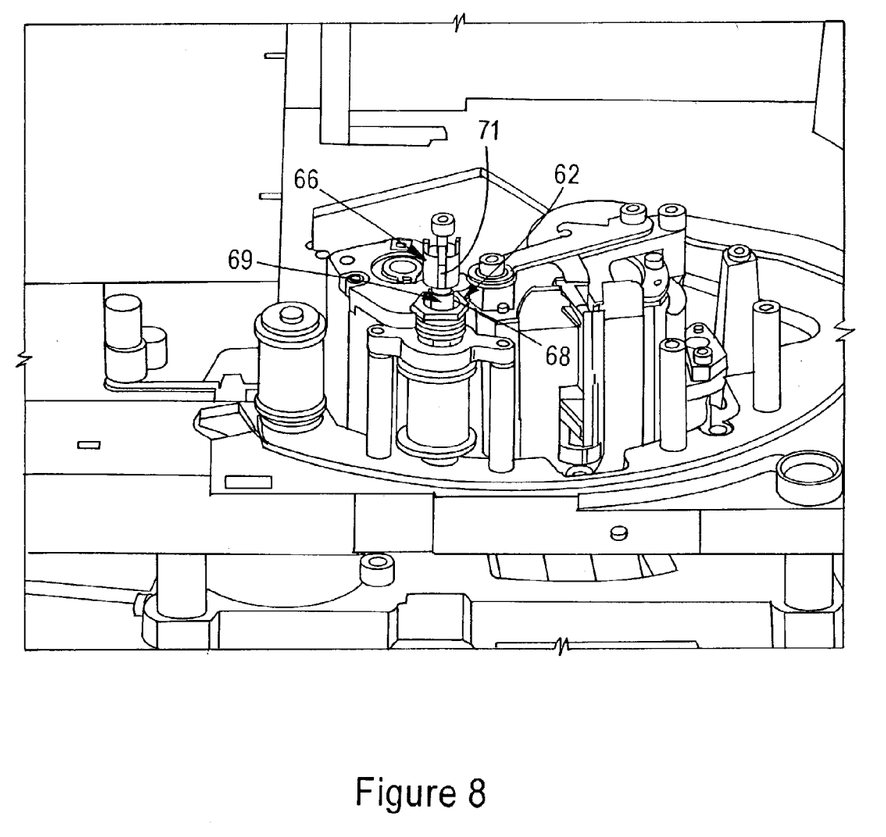
FIG. 8 is an exploded view of the adjustable roller assembly of the present invention.

FIG. 8 shows an exploded view of the mounting of the adjustable guide roller assembly 38. A penetration setting clip 68 is provided with two wings 69 (one of which is illustrated) that are opposed to each other. The penetration setting clip 68 is secured to the eccentric shaft 46. A penetration setting bracket 66 is provided that has slots 71 (one of which is illustrated) which mate with the two wings 69 of the penetration setting clip 68. The penetration setting bracket 66 has four protrusions that are used to rotate the penetration bracket 66. Upon rotation of the penetration setting bracket 66, the eccentric shaft 46 rotates since the penetration setting clip 68 is secured to the eccentric shaft 46. Because the guide roller 40 is mounted on the eccentric portion of the shaft 46, the guide roller 40 translates into and out of the plane of the tape 24.

Figure 9:
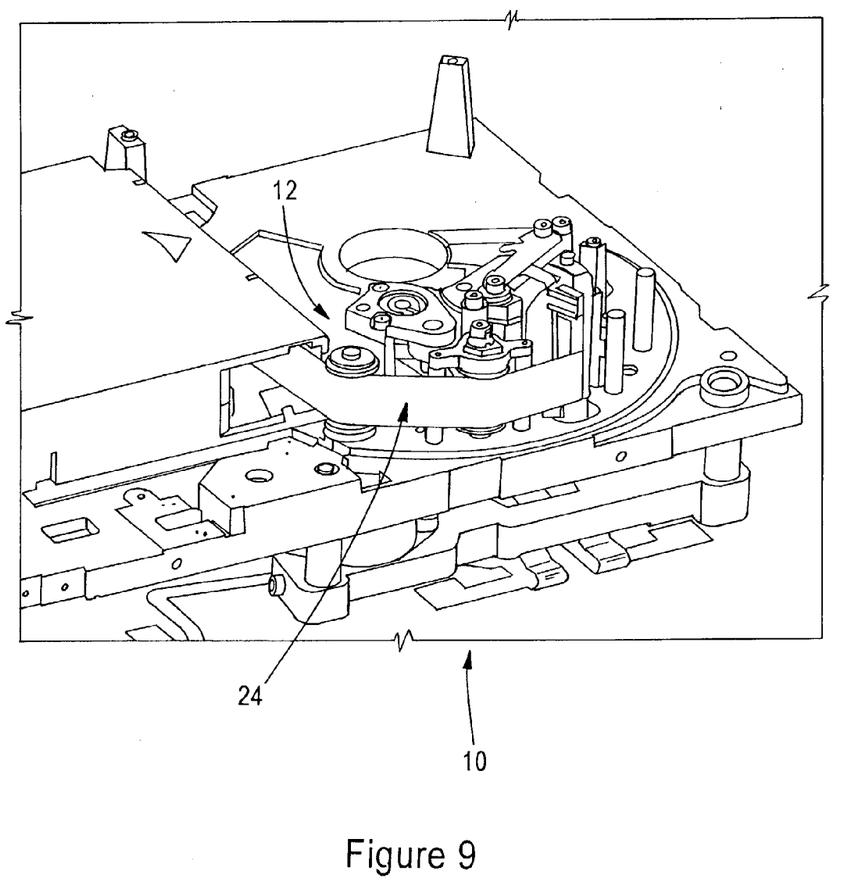
FIG. 9 is a perspective view illustrating a tape guiding assembly with tape being guided.

FIG. 9 shows tape drive 10 with tape 24 extending over a portion of the tape guiding assembly 12.

Figures 10A, 10B:
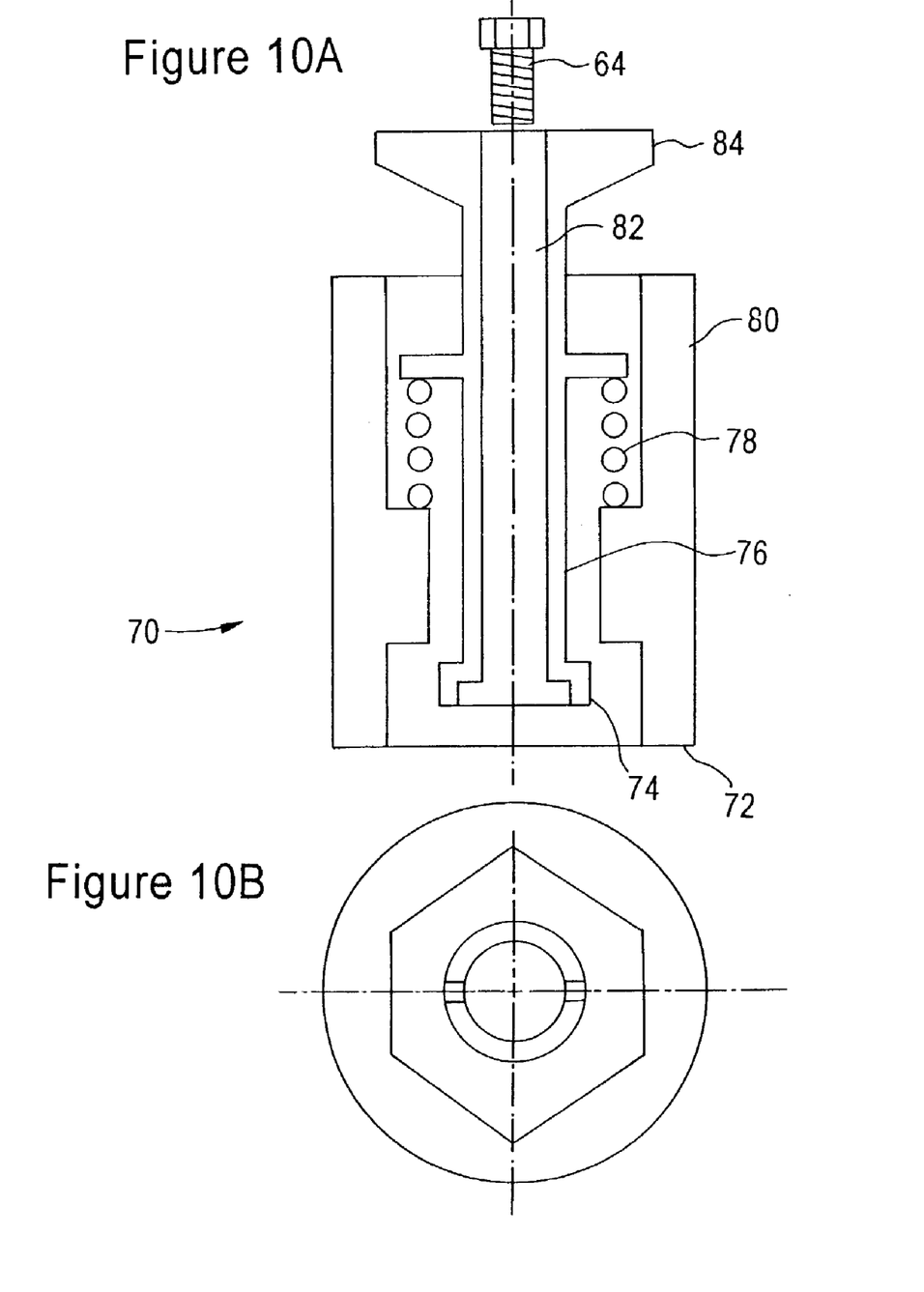
FIG. 10 is a cross-section of an exemplary embodiment of a tool for adjusting the roller height and penetration of the guide roller assembly of FIGS. 5 and 6.

An exemplary embodiment of a tool 70 to adjust the height of the adjustable guide roller assembly 38 and the penetration of the guide roller 40 into the tape 24 is depicted in FIG. 10 in cross-section. The tool 70 includes an outer shell 80 with a hex tool nut end for interacting with the height setting nut 62. Hence, the bottom of the outer shell 80 forms a hexagonal cross-section tool 72.

An inner shell 76 is employed to adjust the wrap angle and penetration by setting the eccentricity of the guide roller 40. A spring 78 biases the inner shell 76 with respect to the outer shell. A knob 84 is employed to manually change the wrap angle setting using an eccentric-set tool 74 at the end of the inner shell 76.

A through-hole 82 through the inner shell 76 provides access for a screw into the tapped hole 52 in the eccentric shaft 46. The screw 86 can be tightened from the top through the through-hole 82.

In operation of the tool 70, the operator engages the tool 70 to the adjustable guide roller 40. The operator then holds the inner shell 76 and rotates the outer shell 80 to adjust the height of the guide roller 40. The operator then holds the outer shell 80 and rotates the inner shell 76 while pushing it down to adjust the penetration of the guide roller 40. Finally, the screw 64 is loaded from the top through the through-hole 82 to tighten the adjustable guide roller assembly 38.

Figure 11:
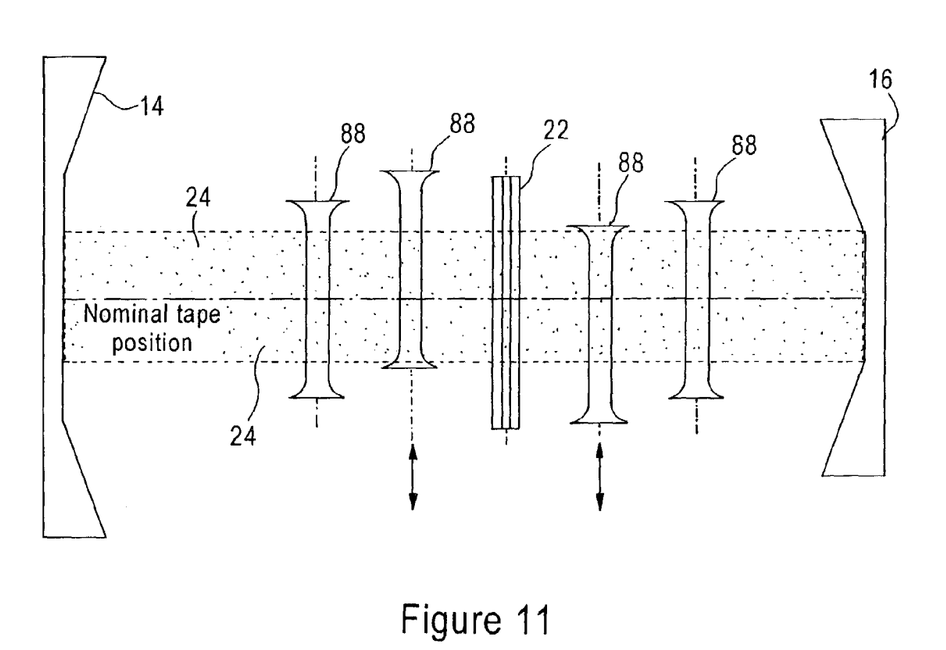
FIG. 11 is a schematic depiction, similar to FIG. 2, of a side view of an alternative embodiment of the present invention.

An alternative embodiment of the present invention, depicted in FIG. 11, provides tapered rollers 88 instead of flanged rollers. Tapers or fillets at the end of the rollers are used to guide the tape at the alternate edges. Such embodiments are especially desirable if the tape edge is subject to wear. In still further embodiments of the invention, fixed posts and flanges are employed instead of rollers. This embodiment is not depicted in the Figures, but is readily understood by one of ordinary skill in the art. Also, in other embodiments of the invention, rollers may be used that are not adjustable in height, but rather are fixed in the positions described (i.e., the outer guides being centered on the nominal tape path, and the inner guides being off-centered with respect to the nominal tape path).

With the present invention, an advantageous tape guiding assembly for a tape drive is provided that allows alternate edge guiding by using rollers, without the definition of two reference surfaces. Further, the invention accomplishes both tape guiding and tape wrapping alignment by adjustment of two inner guide rollers near the read/write head in both vertical and radial directions.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A tape guiding assembly for a tape drive, comprising: a takeup reel that receives tape from a supply reel; and means for constraining motion of the tape;
   wherein the means includes four guides serially positioned along a tape path between the takeup reel and a supply reel, the four guides including two inner guides and two outer guides, the two outer guides centered at a nominal tape path and the two inner guides positioned off-centered from the nominal tape path;
   wherein the inner guides each include a guide roller mounted on an eccentric shaft such that the guide rollers are movable in radial direction to adjust tape wrap and penetration of a magnetic write/read head into the tape.

2. The assembly of claim 1, wherein both of the inner guides are off-centered below the nominal tape path.

3. The assembly of the claim 1, wherein both of the inner guides are off-centered above the nominal tape path.

4. The assembly of claim 1, wherein one of the inner guides is off-centered above the nominal tape path and the other of the inner guides is off-centered below the nominal tape path.

5. The assembly of claim 1, wherein the inner guides are adjustable in height to adjust off-center positioning of the inner guides with respect to the nominal tape path.

6. The assembly of claim 1, wherein the inner guides are roller assemblies.

7. The assembly of claim 6, wherein each roller assembly includes:
   the guide roller, which has a central opening;
   ball bearings within the central opening that support the guide roller;
   the eccentric shaft mounted in the central opening and which supports the ball bearings;
   a washer fixed near one end of the eccentric shaft; and
   a bearing preload spring between the washer and the ball bearings.

8. The assembly of claim 1, wherein each guide has flanges at each end of the guide.

9. The assembly of claim 1, wherein each guide is tapered at each end of the guide.

10. The assembly of claim 1, wherein each guide is fixed in position.

11. A tape drive with a tape guiding assembly that guides tape past a read/write head along a tape path, comprising:
    first and second inner guides disposed along the tape path on opposite sides of the write/read head and adjacent to the read/write head;
    first and second outer guides disposed along the tape path on opposite sides of the read/write head and further from the read/write head than the first and second inner guides;
    wherein the first and second inner guides are positioned off-centered with respect to a nominal tape path and the first and second outer guides are centered on the nominal tape path; and
    wherein the first and second inner guides include guide rollers on an eccentric shaft that are adjustable in radial direction to adjust tape wrap and penetration of a read/write head into the tape.

12. The tape drive of claim 11, wherein the first and second outer guides are fixed in position and the first and second inner guides are adjustable in height to adjust off-center positioning of the inner guides with respect to the nominal tape path.

13. The tape drive of claim 11, wherein the first and second inner guides is roller assemblies, each roller assembly including:
   the guide roller, which has a central opening;
   ball bearings within the central opening that support the guide roller;
   the eccentric shaft mounted in the central opening and which supports the ball bearings;
   a washer fixed near one end of the eccentric shaft; and
   a bearing preload spring between the washer and the ball bearings.

14. The tape drive of claim 13, wherein each guide roller has flanges at each end of the guide.

15. The tape drive of claim 11, wherein both of the first and second inner guides are off-centered either above or below the nominal tape path.

16. The tape drive of claim 11, wherein one of the first and second inner guides is off-centered above the nominal tape path and the other one of the first and second inner guides is off-centered below the nominal tape path.

17. A tape guiding assembly for a tape drive, comprising:
   a takeup reel that receives tape from a supply reel; and
   means for constraining motion of the tape;
   wherein the means includes four guides serially positioned along a tape path between the takeup reel and a supply reel;
   wherein the four guides include two outer guides and two inner guides, the two outer guides centered at a nominal tape path and the two inner guides positioned off-centered from the nominal tape path;
   wherein the inner guides have guide rollers mounted on an eccentric shaft to be translatable into and out of a plane of the tape.

18. A tape drive with a tape guiding assembly that guides tape past a read/write head along a tape path, comprising:
   first and second inner guides disposed along the tape path on opposite sides of the write/read head and adjacent to the read/write head; and
   first and second outer guides disposed along the tape path on opposite sides of the read/write head and further from the read/write head than the first and second inner guides;
   wherein the first and second inner guides are positioned off-centered with respect to a nominal tape path and the first and second outer guides are centered on the nominal tape path; and
   wherein the first and second inner guides have guide rollers mounted on an eccentric shaft to be translatable into and out of a plane of the tape.

* * * * *